United States Patent [19]

Rodeck

[11] 4,219,264
[45] Aug. 26, 1980

[54] CLOSE-UP DEVICE FOR PHOTOGRAPHIC VIEWFINDER CAMERAS

[76] Inventor: Hans-Jürgen Rodeck, Über dem Steinbruch 2, Erkerode, Fed. Rep. of Germany, 3301

[21] Appl. No.: 940,365

[22] Filed: Sep. 7, 1978

[30] Foreign Application Priority Data

Sep. 10, 1977 [DE] Fed. Rep. of Germany ....... 2740929

[51] Int. Cl.² ...................... G03B 11/00; G03B 13/18
[52] U.S. Cl. ..................................... 354/162; 354/295
[58] Field of Search ......................... 354/79, 162–164, 354/166–169, 197, 221, 222, 295; 352/140

[56] References Cited

U.S. PATENT DOCUMENTS

| | | | |
|---|---|---|---|
| 2,526,522 | 10/1950 | Wallendorf | 354/168 |
| 2,674,932 | 4/1954 | Tydings et al. | 354/295 X |
| 2,944,475 | 7/1960 | Goldberg | 354/167 |
| 2,953,981 | 9/1960 | Leitz | 354/164 |
| 3,253,528 | 5/1966 | Bing | 354/222 |
| 3,836,934 | 9/1974 | Suzuki et al. | 354/197 |

FOREIGN PATENT DOCUMENTS

| | | | |
|---|---|---|---|
| 7918581 | 6/1978 | Fed. Rep. of Germany | 354/222 |
| 378347 | 8/1932 | United Kingdom | 354/168 |
| 756001 | 8/1956 | United Kingdom | 354/168 |

*Primary Examiner*—L. T. Hix
*Assistant Examiner*—Thomas H. Tarcza
*Attorney, Agent, or Firm*—Schwartz, Jeffery, Schwaab, Mack, Blumenthal & Koch

[57] ABSTRACT

Disclosed is an interchangeable attachment for photographic viewfinder cameras for increasing the close-up focusing power thereof. This device comprises a supplementary lens optically aligned with the camera objective lens; a parallax correction prism optically aligned with the camera viewfinder; a common view rangefinder system; and a support member for carrying the optically active elements of the device, adapted to be mounted on the camera in front of the camera objective lens. In order to compensate for the change in object distance resulting from the attachment of the device to the camera, the parallax correction prism and the rangefinder system have their optical powers adjusted to correspond to this change, enabling one to directly see through the viewfinder whether the object is in focus and to permit simultaneous correction of the parallax through the viewfinder.

14 Claims, 3 Drawing Figures

U.S. Patent
Aug. 26, 1980
4,219,264
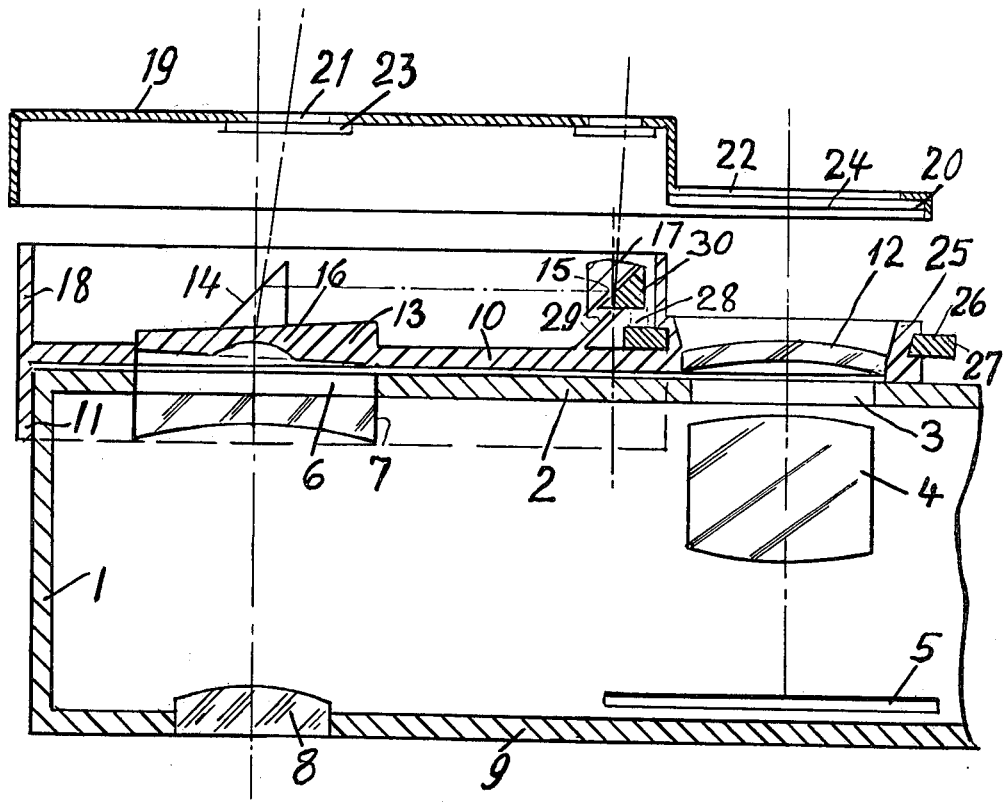
FIG. 2
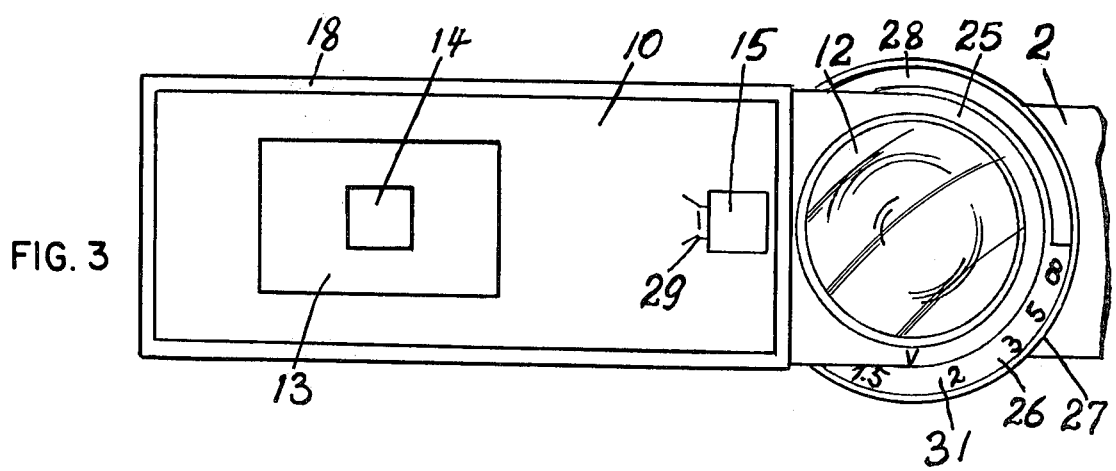
FIG. 1
FIG. 3

CLOSE-UP DEVICE FOR PHOTOGRAPHIC VIEWFINDER CAMERAS

BACKGROUND OF THE INVENTION

The present invention relates to a close-up focusing device for photographic viewfinder cameras. It particularly relates to a close-up focusing device of the type wherein a supplementary lens is interposed in the optical field of the camera objective lens.

In order to increase the close-up focusing range of photographic cameras not equipped with interchangeable objective lenses of greater focal length, it is common to interpose a supplementary lens with the desired refractive power in the optical field of the objective lens. The use of the supplementary lens alters the effective focal length of the objective lens. Since the distance that the objective lens must be moved for focusing is in part determined by the focal length of the supplementary lens, the movement of the objective lens for a given change of focus distance is thus also altered. As a result, the focus adjustment mechanism, such as a rangefinder and viewfinder, must be compensated. With objective lenses of fixed foci, the object distance is determined by the focal length of the supplementary lens, requiring correction of the focus adjustment mechanism. With an objective lens of adjustable focus, the object distance for each setting of the objective must be corrected, conventionally by employing a table giving the actual object distance for each objective setting. In either situation, adjustment of the camera to the correct object distance is laborious. Moreover, the altered viewfinder parallax must also be corrected.

It has therefore been proposed to connect the supplementary lens with a table-like four legged stand, said stand being dimensioned such that the length of the legs correspond to the object distance and that the four legs of the stand indicate the image area. According to another proposal, a telescopic rod is connected for the same purpose with the mount of the supplementary lens, with a frame outlining the image area provided at the free end of the telescopic rod. Such devices make it possible to set the object distance accurately. Accurate parallax markings are also provided to correct the altered parallax. However, these devices have to be carried along, and further, such arrangements are unsuitable for numerous purposes, especially when contact with the object interferes with their use or precludes their use altogether.

SUMMARY OF THE INVENTION

Accordingly, it is an object of the present invention to provide a close-up focusing device which eliminates the aforementioned disadvantages of the prior art.

It is a particular object of the present invention to provide a close-up focusing device which enables one to see whether the object is in focus through the viewfinder and results from utilization of the supplementary lens in the telescopic viewfinder, together with simultaneous correction of the viewfinder parallax.

In accordance with the instant invention, the foregoing disadvantages of the prior art may be eliminated through the provision of a close-up focusing device which permits one to see whether the object is in focus through the viewfinder, resulting from the utilization of the supplementary lens, in the telescopic viewfinder or eye-level viewfinder functioning as a rangefinder, together with the simultaneous correction of the parallax. This feature enables the photographer to set the exact position of the object of the exposure, when working without a support, in the focusing plane and in the field of the viewfinder, and to thereafter directly activate the shutter once focus has been attained.

To this end, there is provided in accordance with the present invention a close-up focusing device comprising an interchangeable attachment adapted to be mounted on a camera, which comprises a supplementary lens; a parallax compensation prism for the eye-level viewfinder; a common view base rangefinder; and a common support, attachable to the front wall of the camera, for the optically active elements of the device, wherein the parallax compensation prism and the base rangefinder are set to correspond to the change in the object distance resulting from interposition of the supplementary lens in the optical field of the camera objective lens. Consequently, simple attachment of the supplementary close-up focusing device to the camera serves to convert the object lens of the camera for photographing close-up objects, and to simultaneously convert the eye-level viewfinder into a view rangefinder with a compensated setting and correct the altered viewfinder-parallax.

Further objects, features, and advantages of the present invention will become apparent to the skilled artisan upon examination of the following detailed description of the present invention, taken in conjunction with the accompanying figures of drawing, wherein:

FIG. 1 is a horizontal longitudinal section of the camera with the supplementary close-up focusing device attached thereto;

FIG. 2 is a section of the cover cap of the device which is attached to the camera face wall; and FIG. 3 is a top view of the camera face wall with the close-up focusing device attached thereto.

DETAILED DESCRIPTION OF THE PREFERRED EMBODIMENTS

A camera having the instant device attached thereto is schematically illustrated in FIGS. 1 and 2, comprising housing 1 formed with a front plate 2. Disposed behind opening 3 in front plate 2 is the object lens 4 for exposing the film 5. The object lens 4 may be either of the fixed foci or adjustable foci type. Laterally displaced from the opening 3, the front plate 2 contains an opening 6 for the eye-level viewfinder, comprising lens 7 and eyepiece 8, located in rear wall 9 of the camera housing 1. In the embodiment shown in the drawings, in all other respects, the camera comprises a conventional rod-formed miniature camera having a reversed Galilei-system viewfinder, although it is to be emphasized that other types of cameras may also be used with the instant invention, such as would be obvious to those skilled in the art, without departing from the inventive concepts of the instant invention. It is obvious that the design of the subject matter of the invention is subject to some deviations according to the selected camera type, without changing the principle invention idea as described in the following.

In the embodiment shown in the drawings, the close-up focusing device of the present invention comprises a rectangular plate 10 with three downwardly-extending side walls 11, which are constructed so as to correspond with the dimensions of the housing 1, and thus form means for mounting the supplementary device to the camera. Obviously, additional holders, such as screws and the like, can also be utilized. The plate 10 has an opening 3 optically aligned with the object lens 4, wherein the supplementary lens 12 is mounted. Optically aligned with the viewfinder opening 6 and lens 7 on the plate 10 is the prism 13. The prism 13 comprises a parallax correction prism and is constructed such that the parallax magnification, arising when the supplementary lens is utilized, can be compensated. Any suitable parallax correction prism well known to those skilled in the art may be utilized, typical examples of which are disclosed in U.S. Pat. No. 3,836,934, the entirety of which is herein incorporated by reference.

In the middle of prism 13 there is attached a mirror 14, such as for example, a beam-splitter prism having a partially reflecting mirror on its hypotenuse, which, in connection with end mirror 15, forms a base rangefinder system. The end mirror 15 preferably comprises a reflex prism having a mirror on its base side. Thus, an unsymmetrical base rangefinder and a view rangefinder, respectively, are formed. The face of the prism 13 directed to the camera has a concavely ground portion in the area of the mirror 14, which forms concave lens 16, and correspondingly the exit opening of the reflex prism 15, directed to the object, is formed as convex lens 17. This arrangement enables the longer path of the measuring rays, characteristic of unsymmetric base rangefinders, to be compensated. The mirrors 14 and 15, together with the parallax compensation prism 13, are adjusted such that the viewfinder ray, the rangefinder ray and the optical axis of the camera intersect at one point on the camera optical axis. This point corresponds to the reduced object length to which the camera lens is adjusted by means of the supplementary lens 12. As a result of this arrangement, one can directly see through the viewfinder whether the object is in focus without the necessity for resorting to supplementary tables, scales, etc. to compensate for the change in object length produced by the supplementary lens.

To protect the mirrors 14 and 15, the plate 10 has upwardly extending box-like sides 18, on which can be attached a protective cap 19 together with an added protective cover 20 for the supplementary lens 12. The exit openings of the rays 21 and 22 are sealed and dustproofed by means of windows 23 and 24. The instant device can be manufactured with relatively low cost, when the parallax compensation prism 13 together with the prisms 14 and 15 and the supplementary lens 12 are embedded in the plastic plate 10. These elements, of course, should be manufactured of optical grade glass. Alternatively, however, the optically active portion of the device may be formed of an integral piece of transparent, optical quality, plastic by die-casting or pressing, so that the complete device comprises two parts, specifically the optically active portion of the device, integrally formed in the support 10, and, if need be, the protecting cap 19.

Use of the instant close-up focusing device or attachment is very simple. The photographer must merely select the attachment with the desired supplementary lens refractive power and attach it to the camera. By merely looking through the viewfinder, the photographer can determine whether the photographic object is exactly in focus; if necessary, the object can be brought into exact focus by varying the distance between the camera and the photographic object. Once the viewfinder indicates that the camera is focused, the shutter release may be then directly activated. This feature is especially advantageous when operating in the close-up focusing range.

When using the instant close focusing attachment with a fixed adjustment of the mirror 15 with cameras having an adjustable object lens, the object lens must be adjusted to infinity. In a further embodiment of the present invention, however, the attachment of the present invention may also be utilized with cameras having adjustable object lens, in which the adjustability of the object lens is fully available. For this purpose a ring 26 with knurling 27 is rotatably mounted on the supplementary lens mount 25. This ring bears an axial cam 28. The base end mirror 17 is connected with the support 10 by means of an elastic mount 29 and has its lower edge 30 elastically seated on the cam 28. Turning of the ring 26 pivots the mirror 15 about an axis normal to its optical axis, whereby the intersection distance of the view- and rangefinder rays is changed. Preferably, the cam 28 is constructed such that the intersection distance of the measuring rays can be adjusted to all object lengths, resulting from the refractive power of the supplementary lens 12 and the focusing ability of lens 4. To coordinate the focusing of the rangefinder and camera lens, the selector ring 26 is advantageously formed with a focusing scale 31 thereon which corresponds to a similar scale on the object lens focusing mount. The ring 26, therefore, can be coordinated to the same object distance as the object lens 4; thus the camera and the viewfinder rangefinder of the close focusing attachment, respectively, are all coordinated to the same object distance.

As the viewfinder ray and thus the viewfinder parallax are also not adjusted in this embodiment, it is desirable, in order to coordinate the viewfinder with the focusing of the object lens 4, to adjust the prism 13 to a medium close distance in order to reduce parallax failure to a minimum, without affecting the correct intersection distance of the rangefinder.

With cameras which are focused by means of a linearly moveable slide, the close-up focusing device may be suitably modified by replacing the ring 26, axial cam 28, and the circular focusing scale 31 with a linear slide having a similar cam and scale, in order to provide the amateur photographer with a particularly advantageous mode of operation.

While the instant invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An interchangeable close-up focusing device for use with a photographic viewfinder camera having a front wall containing a viewfinder system and an opening for a camera objective lens, comprising:
   a. a support member adapted to be mounted to the front wall of said camera;
   b. a supplementary lens mounted on said support member so as to be in optical alignment with said camera objective lens for enhancing the close-up focusing power of said objective lens;
   c. a parallax correction prism mounted on said support so as to be in optical alignment with said camera viewfinder system; and
   d. a non-symmetric base view rangefinder system arranged on said support member such that the rangefinder beam is deflected into the field of view of said camera viewfinder, said parallax correction prism and said rangefinder system having their optical powers adjusted to correspond to the change in object distance resulting from interposition of said supplemental lens in the optical field of said camera objective lens.

2. The device of claim 1, further comprising a cover cap adapted to be mounted on said support member over said supplementary lens, parallax correction prism, and rangefinder system.

3. The device of claim 2, wherein said cover cap has openings therein for the viewfinder, rangefinder, and supplementary lens optical field.

4. The device of claim 1, wherein said parallax correction prism forms part of said rangefinder system.

5. The device of claim 4, wherein said parallax correction prism has a concavely ground portion forming a concave lens; and said rangefinder system comprises said concave lens, a beam-splitter prism disposed on said parallax correction prism in optical alignment with said concave lens, and a reflex prism having its face directed toward an object formed as a convex lens, said reflex prism being laterally displaced from said parallax correction prism and beam-splitter prism.

6. The device of claim 5, wherein said support member is comprised of thermoplastic; and said supplementary lens, parallax correction prism and beam-splitter prism, and said reflex prism are embedded in said support member.

7. The device of claim 5, wherein said supplementary lens, said parallax correction prism, and said support member comprise an integral single piece of transparent thermoplastic material.

8. The device of claim 5, wherein said reflex prism has a fixed position.

9. The device of claim 8, wherein said camera objective has a fixed focus.

10. The device of claim 8, wherein said camera objective has an adjustable focus which is adjusted to infinity.

11. The device of claim 5, wherein said reflex prism is moveable about a pivot point normal to its optical axis, and said camera having an adjustable focus.

12. The device of claim 11, wherein said reflex prism is mounted on said support member by means of an elastic mount, and said device further comprises means for moving said reflex prism about its axis.

13. The device of claim 12, wherein said means comprises a setting ring rotatably mounted on said support around said supplemental lens, said ring carrying an axial cam which engages said reflex prism and moves said prism about its pivot point.

14. The device of claim 13, wherein said camera objective lens has a focusing scale, and said setting ring has a focusing scale formed thereon which corresponds to said camera objective lens focusing scale and has said cam associated therewith such that when said scales have identical settings, the optical power of said rangefinder is matched to correspond to the object distance resulting from interposition of said supplemental lens in the optical field of said camera objective lens.

* * * * *